US008675712B1

(12) United States Patent
Jin et al.

(10) Patent No.: US 8,675,712 B1
(45) Date of Patent: Mar. 18, 2014

(54) ZERO DELAY REDUCED MEMORY GPS PRN CODE INTERPOLATION

(75) Inventors: Xiangdong Jin, Mountain View, CA (US); Mao Yu, San Jose, CA (US); Jianwei Bei, Rockville, MD (US); Xiaotao Xu, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 320 days.

(21) Appl. No.: 13/080,955

(22) Filed: Apr. 6, 2011

Related U.S. Application Data (60) Provisional application No. 61/322,256, filed on Apr. 8, 2010.

(51) Int. Cl.
*H04B 1/00* (2006.01)
(52) U.S. Cl.
USPC .......................................... 375/147; 375/140
(58) Field of Classification Search
USPC ............. 375/147, 140, 130, 148; 342/357.06, 342/357.12
See application file for complete search history.

(56) References Cited

U.S. PATENT DOCUMENTS

| 5,847,678 | A  | * | 12/1998 | Tachita ..................... 342/357.75 |
| 6,546,040 | B1 | * | 4/2003 | Eschenbach .................. 375/140 |
| 7,197,064 | B2 | * | 3/2007 | Loomis et al. ................ 375/148 |
| 2001/0043644 | A1 | * | 11/2001 | Dooley et al. ................. 375/150 |
| 2003/0016167 | A1 | * | 1/2003 | Dooley et al. ............ 342/357.06 |
| 2008/0218401 | A1 | * | 9/2008 | Loomis et al. ................. 342/66 |
| 2010/0074308 | A1 | * | 3/2010 | Young ........................... 375/150 |
| 2013/0022085 | A1 | * | 1/2013 | Krasner ....................... 375/142 |

* cited by examiner

*Primary Examiner* — Shuwang Liu
*Assistant Examiner* — Helene Tayong (57) ABSTRACT

In accordance with the teachings described herein, system and methods are provided for a GPS PRN code interpolation scheme with a reduced memory requirement. An example GPS receiver system may include a memory, a local PRN code generator, and an interpolator. The memory may be used to store GPS PRN code received from a global positioning satellite. The local PRN code generator generates a replica PRN code having a repeating code that includes at least a first epoch and a second epoch. The interpolator determines an offset point in the first epoch of replica PRN code and interpolates the replica PRN code at a predetermined sample rate to generate an interpolated replica PRN code for use in correlating with the GPS PRN code.

20 Claims, 5 Drawing Sheets

ZERO DELAY REDUCED MEMORY GPS PRN CODE INTERPOLATION

CROSS-REFERENCE TO RELATED APPLICATIONS

This application claims priority from U.S. Provisional Patent Application No. 61/322,256, filed on Apr. 8, 2010, the entirety of which is incorporated herein by reference.

FIELD

The technology described in this patent document relates generally to global positioning system (GPS) code processing. More particularly, systems and methods are disclosed for a reduced memory GPS PRN code interpolation scheme.

BACKGROUND

GPS satellites broadcast signals enabling GPS receivers on the earth's surface to calculate position. GPS satellites transmit data along an L1 frequency and an L2 frequency. The L1 frequency is known as the course acquisition (C/A) code. The C/A code is available for civilian use and is a 1.023 MHz pseudorandom noise (PRN) code, which repeats its 1023 bits each millisecond. Each satellite transmits a unique PRN code so that GPS receivers can identify each satellite based on the PRN code received from a given satellite. 1,023 PRN codes exist, but presently only 32 PRN codes are used—one for each of the 32 GPS satellites in orbit.

Figure 1A:
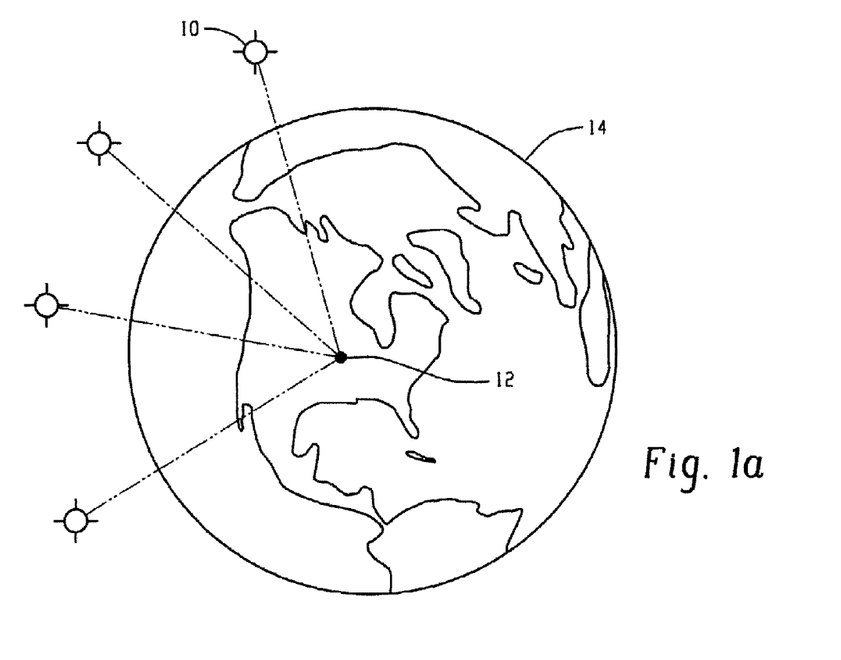
FIGS. 1a and 1b illustrate a typical process for determining position on the earth via GPS satellites.

FIG. 1a illustrates a typical process for determining position on the earth 14 via GPS. The satellites 10 orbit the earth 14 and constantly transmit PRN codes. Object 12 is located on or near the earth's surface and may include a vehicle, such as an airplane, automobile, motorcycle, ship, or train or a mobile device, such as a cell phone, smartphone, camera, computer, personal navigation device, or video game player. The object 12 is equipped with a GPS receiver that can receive and demodulate incoming GPS signals. In the example shown in FIG. 1a, at least four satellites 10 are used to determine the location of the object 12. The GPS receiver on object 12 utilizes the unique PRN code transmitted by each GPS satellite to determine parameters including (i) which signal the GPS receiver is receiving and (ii) at what time delay the GPS receiver is receiving each signal. With these parameters, the location of the object 12 may be determined.

In order to determine the delay for a received PRN code, a GPS receiver must correlate the received GPS PRN code with its own locally generated copy (or replica) of the PRN code. The correlation process attempts to align the received GPS PRN code with a locally generated replica PRN code, so that the GPS receiver can determine the time delay of the satellite's signal, which is used to calculate position. However, because the receiver does not know the code phase or Doppler information of the satellite signal, the correlation process typically requires thousands of correlations to be performed in order to determine a match.

Figure 1B:
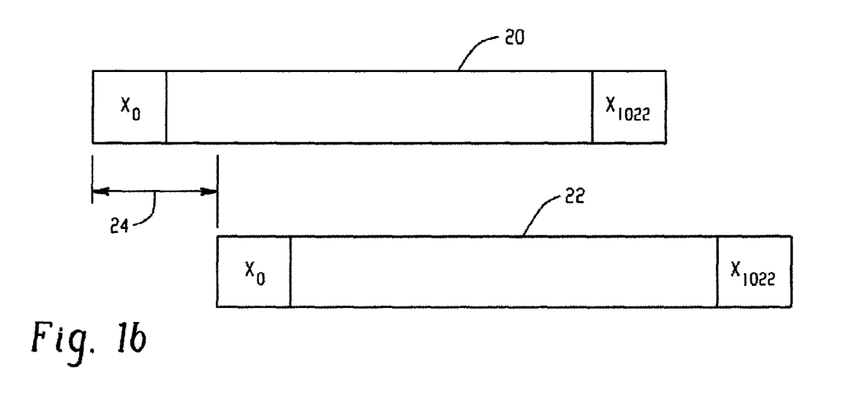

FIG. 1b demonstrates a typical delay between a received GPS PRN code 20 and a replica PRN code 22. The offset 24 represents the delay that a GPS receiver calculates in order to correlate the replica PRN code 22 with the received GPS PRN code 20. To determine the correct code phase, a receiver typically tries all possible code phases of its replica PRN code 22 to determine a match. This process is typically performed by shifting the replica PRN code 22 through each possible 1,023 bits of code and correlating the replica PRN code 22 with the received GPS PRN code 20 at each shift. The GPS receiver then determines if there is a match after performing each of the correlations.

To determine the correct code phase, a receiver must try all possible code phases of its replica PRN code to find the offset and determine a match. Further complicating the correlation process is the possible Doppler shift. Rather than the phase of the code being off by an exact integral number of milliseconds, the Doppler shift may cause the PRN code to differ by fractions of a pulse width.

Typical approaches to the correlation process may involve the use of Doppler bins. A Doppler bin represents a fixed offset for each possible code phase adjusted for the Doppler shift. For each Doppler shift, there will be at least 1,023 corresponding phase shifts that must be accounted for during the correlation process. This process requires extensive amounts of memory to store the epochs of PRN code at all of the Doppler shifts.

Figure 2:
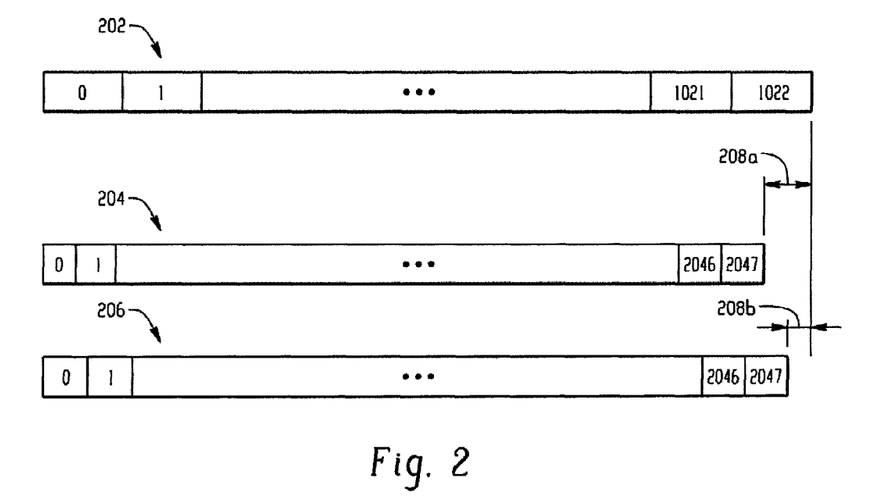
FIG. 2 illustrates a typical correlation system for a GPS receiver.

FIG. 2 illustrates an example of a typical correlation process for a GPS receiver utilizing Doppler bins. The process includes GPS PRN code 202 and locally generated Doppler PRN codes 204 and 206. The GPS PRN code 202 is received from a satellite at a GPS receiver. Because there is some delay associated with the orbit of the satellite and the movement of the GPS receiver, an offset 208 may be present. Depending on the number of Doppler bins used, there may be over 500 different offsets to match with the frequency of the incoming GPS PRN code. Accordingly, Doppler PRN, codes 204 and 206 represent only two examples of different offsets. For Doppler PRN code 204 an offset 208a is present. This offset 208a represents the difference in frequency between the GPS PRN code 202 and the locally generated Doppler PRN code 204. In order to properly correlate the GPS PRN code 202 with locally generated PRN code, the offset 208 should be near zero. Doppler PRN code 206 represents a smaller offset 208b, however, it is still not a close enough match to utilize for correlations. A GPS correlation process typically processes epochs of locally generated PRN codes at each possible Doppler offset to find a match.

The correlation process utilizing Doppler bins requires extensive amounts of memory because the correlation process requires storing each possible epoch of code for each Doppler bin used in the correlation process.

SUMMARY

In accordance with the teachings described herein, system and methods are provided for a GPS PRN code interpolation scheme with a reduced memory requirement. An example GPS receiver system may include a memory, a local PRN code generator, and an interpolator. The memory may be used to store GPS PRN code received from a global positioning satellite. The local PRN code generator generates a replica PRN code having a repeating code that includes at least a first epoch and a second epoch. The interpolator determines an offset point in the first epoch of replica PRN code and interpolates the replica PRN code at a predetermined sample rate to generate an interpolated replica PRN code for use in correlating with the GPS PRN code. The interpolated replica PRN code is generated by: interpolating, from a starting point in the second epoch of replica PRN code to an end point in the second epoch of PRN code; and returning to the offset point in the first epoch of PRN code and interpolating from the offset point in the first epoch of PRN code to the starting point in the second epoch of PRN code, such that a full epoch of replica PRN code is interpolated from the offset point to the end point.

The interpolator may also change the offset point in the first epoch of replica PRN code and repeat the interpolating steps. Each offset of replica PRN code may correspond to a Doppler offset.

The GPS receiver may also output the interpolated replica PRN code to a memory and be correlated with the GPS PRN code. The interpolated replica PRN code may be removed from the memory after the interpolating steps are repeated or after the interpolated replica PRN code is correlated with the GPS PRN code.

A method for interpolating GPS PRN codes may include the following steps: receiving, at a GPS receiver, a GPS PRN code from a global positioning satellite; generating, at the GPS receiver, a replica PRN code having a repeating code that includes at least a first epoch and a second epoch; determining, at the GPS receiver, an offset point in the first epoch of replica PRN code; and interpolating, at the GPS receiver, the replica PRN code at a predetermined sample rate to generate an interpolated replica PRN code for use in correlating with the GPS PRN code, the interpolated replica PRN code being generated by: interpolating, from a starting point in the second epoch of replica PRN code to an end point in the second epoch of PRN code; and returning to the offset point in the first epoch of PRN code and interpolating from the offset point in the first epoch of PRN code to the starting point in the second epoch of PRN code, such that a full epoch of replica PRN code is interpolated from the offset point to the end point.

One example system may include a mobile device comprising an antenna, a memory, a local PRN code generator, and an interpolator. The memory may be used to store GPS PRN code received from a global positioning satellite. The local PRN code generator generates a replica PRN code having a repeating code that includes at least a first epoch and a second epoch. The interpolator determines an offset point in the first epoch of replica PRN code and interpolates the replica PRN code at a predetermined sample rate to generate an interpolated replica PRN code for use in correlating with the GPS PRN code. The interpolated replica PRN code is generated by: interpolating, from a starting point in the second epoch of replica PRN code to an end point in the second epoch of PRN code; and returning to the offset point in the first epoch of PRN code and interpolating from the offset point in the first epoch of PRN code to the starting point in the second epoch of PRN code, such that a full epoch of replica PRN code is interpolated from the offset point to the end point.

One example system may include a navigation system for a vehicle comprising an antenna, a memory, a local PRN code generator, and an interpolator. The memory may be used to store GPS PRN code received from a global positioning satellite. The local PRN code generator generates a replica PRN code having a repeating code that includes at least a first epoch and a second epoch. The interpolator determines an offset point in the first epoch of replica PRN code and interpolates the replica PRN code at a predetermined sample rate to generate an interpolated replica PRN code for use in correlating with the GPS PRN code. The interpolated replica PRN code is generated by: interpolating, from a starting point in the second epoch of replica PRN code to an end point in the second epoch of PRN code; and returning to the offset point in the first epoch of PRN code and interpolating from the offset point in the first epoch of PRN code to the starting point in the second epoch of PRN code, such that a full epoch of replica PRN code is interpolated from the offset point to the end point.

DETAILED DESCRIPTION

Figure 3:
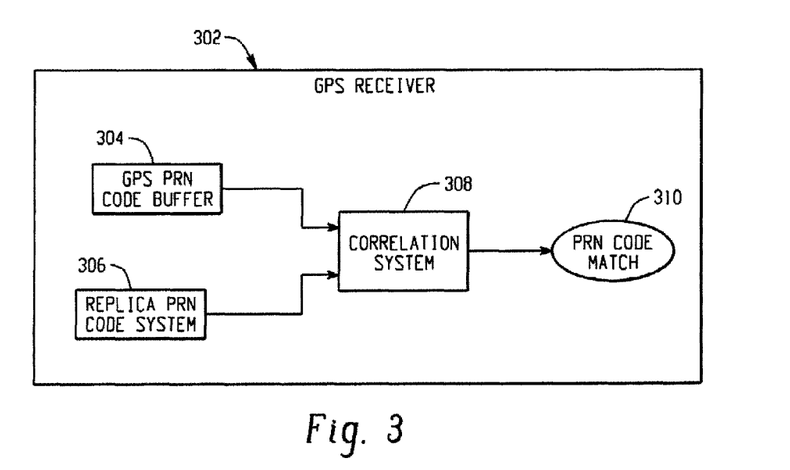
FIG. 3 is an example GPS receiver for interpolating and correlating GPS PRN codes.

FIG. 3 is a block diagram of an example GPS receiver 302 for interpolating and correlating GPS PRN codes. The GPS receiver 302 includes a GPS PRN code buffer 304, a replica PRN code system 306, a correlation system 308, and a PRN code match output 310. In operation the GPS receiver 302 receives GPS PRN code from one or more satellites. After initial processing and interpolation, the GPS PRN code is stored in the GPS PRN code buffer 304. The interpolated GPS PRN code is then correlated with locally produced replica PRN code in the correlation system 308. Before this correlation process can proceed, however, replica PRN code must be generated.

The replica PRN code system 306 is configured to generate a replica PRN code to correlate with the GPS PRN code in the correlation system 308. In order to account for the Doppler effect and phase shift of the GPS PRN code, the replica PRN code system 306 is configured to generate multiple permutations of the same epoch of PRN code. To accomplish this, the replica PRN code system adjusts the frequency of the replica PRN code in an attempt to match the Doppler shift of the GPS PRN code. Rather than storing thousands of epochs of code representing each Doppler bin, however, the replica PRN code system calculates each Doppler offset as the replica PRN code is processed. Therefore, only one epoch of replica PRN code may be stored at a given time. Once the stored epoch of replica PRN code is processed in the correlation system 308, it is discarded from memory. The next epoch of replica PRN code representing a subsequent Doppler offset is stored in its place and processed in the same manner.

The replica PRN code system 306 adjusts the frequency of the replica PRN code for a fixed number of Doppler offsets as described in detail below in reference to FIG. 4. Based on the adjusted frequency, the replica PRN code of FIG. 3 is interpolated at a rate of 2 MHz. Because a rate of 2 MHz is used in the example of FIG. 3, the 1,023 bits will be interpolated to 2,048 bits. After each interpolation, an epoch of replica PRN code is generated and stored until it can be correlated with the GPS PRN code. This stored epoch of interpolated replica PRN code is then shifted 2,048 times so that each possible phase shift of PRN code is compared to the GPS PRN code in the correlation system 308. This process is repeated for each Doppler offset.

The correlation system 308 may be a typical correlation system known in the art, but may also include a correlation system as described in U.S. Patent Application titled "GPS Acquisition Correlation Scheme with Reduced Memory Requirement." The correlation system 308 receives as inputs GPS PRN code from the GPS PRN buffer 304 and interpolated replica PRN code from the replica PRN code system 306. Although the GPS PRN code will remain unchanged throughout this process, the interpolated replica PRN code received at the correlation system will differ for each Doppler offset and for each shift through the 2,048 bits of the code. After the correlation system 308 has compared each permutation of the interpolated replica PRN code with the GPS PRN code, a match may be determined and outputted. PRN code match 310 represents the correlated replica PRN code which may be utilized by the GPS receiver 302 to determine location parameters.

Figure 4:
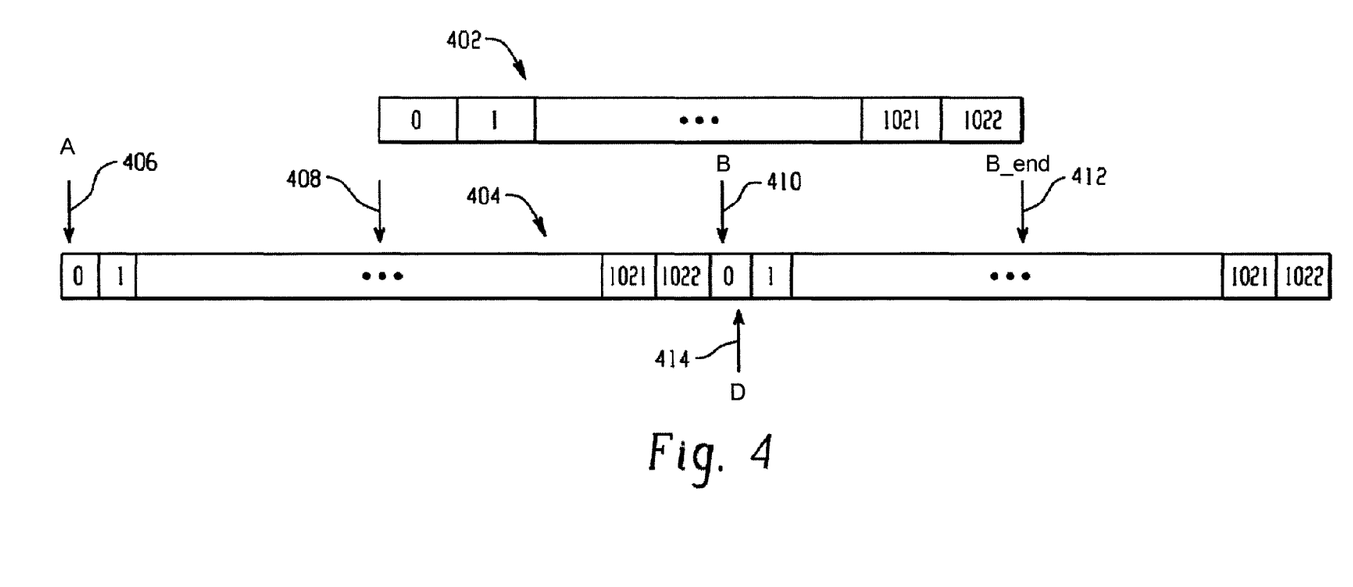
FIG. 4 illustrates an example interpolation process utilizing Doppler offset calculations.

FIG. 4 illustrates an example interpolation process for the replica PRN code system of FIG. 3. Generally, the example in FIG. 4 describes GPS PRN code 402 being matched with a corresponding segment of replica PRN code 404. As described above with reference to FIG. 3, the replica PRN code system generates repeating epochs of replica PRN code with the same PRN sequence as the received GPS PRN code. In order to correlate both sets of code, however, the frequency is matched to accommodate for any Doppler shift.

In FIG. 4, various interpolation reference points can be calculated on the replica PRN code 404 so that different frequency offsets can be generated for comparison. The various reference points on the replica PRN code 404 include reference point A 406, maximum offset 408, reference point B 410, reference point B_End 412, and reference point D 414. Along with these reference points, the replica PRN code system is configured with a maximum Doppler frequency shift, $\Delta$, which, when used in conjunction with a 2 MHz sampling rate, is close to 0.5, but not greater. $\Delta$ is used to calculate the maximum offset 408 in the following equation:

$$Max\_offset = \Delta * 2,048$$

The maximum offset 408 represents the maximum frequency shift due to the Doppler effect that is assumed for the example in FIG. 4. Depending on how many milliseconds have elapsed from the initial processing of the replica PRN code, the maximum offset 408 may be adjusted with the following equation, where N equals the number of milliseconds:

$$New\_offset = N * Max\_offset \% 1023$$

The New_offset is utilized to calculate each of the reference points. For example, reference point A 406 is calculated with the following equation:

$$A = New\_offset - [New\_offset] * 2 * inc$$

In the preceding equation, [New_offset] represents the integer value of New_offset and "inc" represents the increment of each interpolation sample step. Thus, in the example of FIG. 4, "inc" may range from 0 to 2,048.

After the maximum offset 408 and reference point A 406 are determined, the remaining reference points B, D, and B_end may be calculated from the following equations:

$$B = (A + 2048 * inc) \% 1023$$

$$D = (B + inc) \% 1023$$

$$B\_end = B + ([New\_offset] * 2 - 1) * inc$$

In operation, the reference points of FIG. 4 provide for starting and ending points for the interpolation process. After calculating each reference point, the interpolation process may begin at reference point B 410. If reference point B 410 is less than zero, however, the process starts at reference point D 414. From either starting point, the replica PRN code is interpolated until the process reaches reference point B_end 412. From reference point B_end 412, the interpolation process stops and returns, or jumps back, to reference point New_offset. From reference point New_offset, the replica PRN code is interpolated until it reaches its initial starting point, either reference point B or D. After each interpolation cycle is complete, N is adjusted and the next millisecond of replica PRN code is interpolated at a different Doppler offset. The process may continue until all Doppler offsets have been accounted for. The output of this interpolation process is a 2,048 bit interpolated replica PRN code that can be used in the correlation process to correlate with the GPS PRN code.

Figure 5:
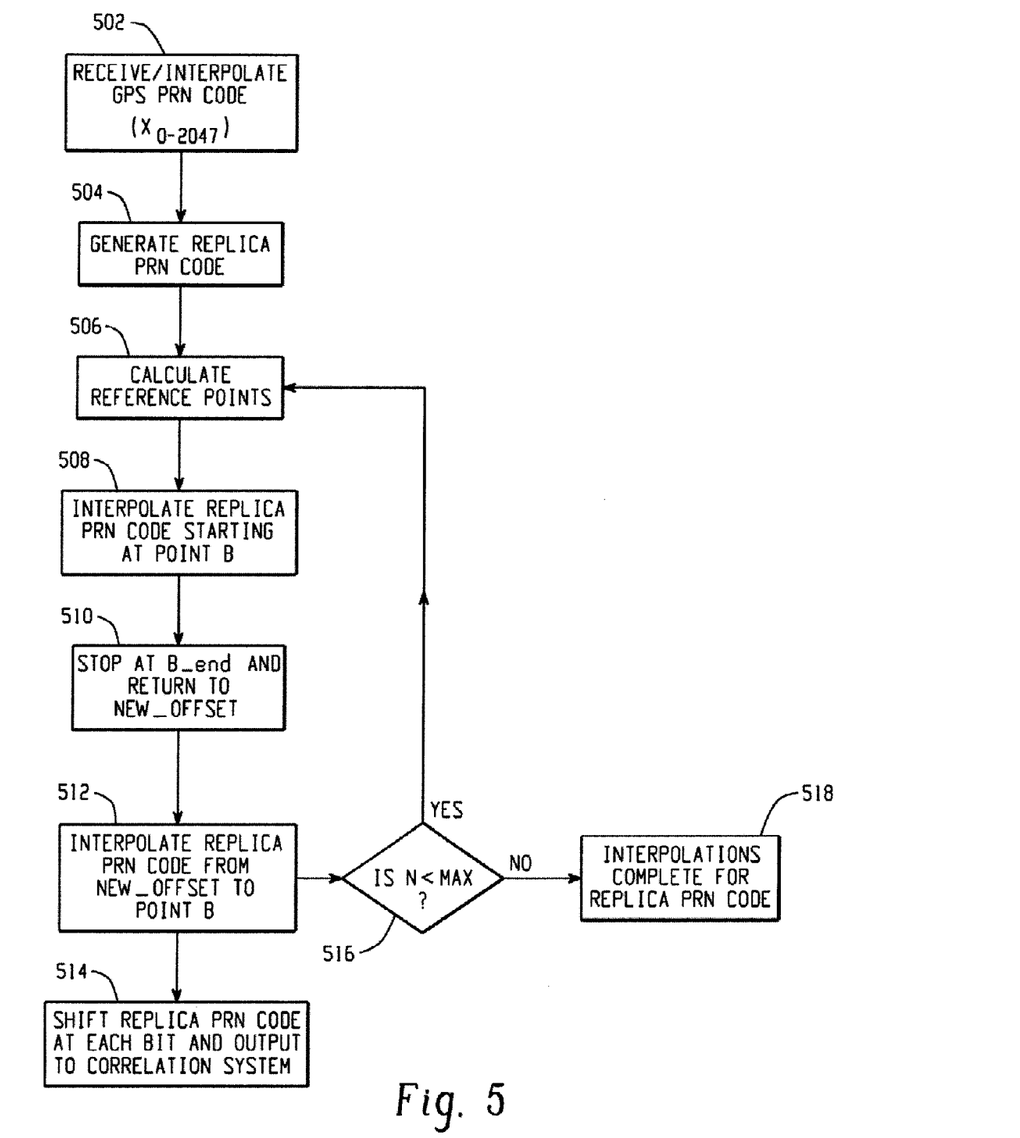
FIG. 5 is a flow diagram of an example process for interpolating replica PRN codes.

FIG. 5 is a flow diagram illustrating an example method of interpolating PRN codes. At step 502, a GPS receiver receives GPS PRN code from a satellite. The GPS PRN code is then interpolated at a predetermined sample rate. For the example illustrated in FIG. 5, the GPS PRN code is interpolated to 2,048 bits. The interpolated GPS PRN code is then stored in a memory or buffer.

In step 504, a local PRN code generator produces a replica PRN code. The replica PRN code corresponds to the GPS PRN code received at step 502 and contains the same number of bits as the GPS PRN code.

At step 506 the system calculates the interpolation reference points from FIG. 4. Once these reference points have been determined, interpolation of the replica PRN code may begin at step 508. At step 508, the interpolation process begins at reference point B and continues through the epoch of replica PRN code until it reaches reference point B_end at step 510. At step 510 the interpolation process returns, or jumps back, to reference point New_offset. The interpolation process continues at step 512 from reference point New_offset until reference point B is reached again. When the interpolation process reaches reference point B it will have a complete 2,048 bit epoch of replica PRN code.

At step 514, the interpolated replica PRN code is output to the correlation system to be compared with the received GPS PRN code. The interpolated replica PRN code may be shifted up to 2,048 times so that each epoch of interpolated PRN code at each Doppler offset may be correlated with the GPS PRN code at each phase shift. After the interpolated replica PRN code is shifted across the entire epoch, it is discarded from memory so that the next permutation of interpolated replica PRN code may be processed.

Even though an interpolated replica PRN code is output to the correlation system at step 514, the interpolation process in steps 506-512 may continue for each possible Doppler offset. At step 516, if N is less than the maximum number of Doppler offsets, then the interpolation process returns to step 506 and repeats at the next Doppler offset. If N is not less than the maximum number of Doppler offsets, however, then all of the possible Doppler offsets have been used for interpolation and the process is complete.

Figure 6A:
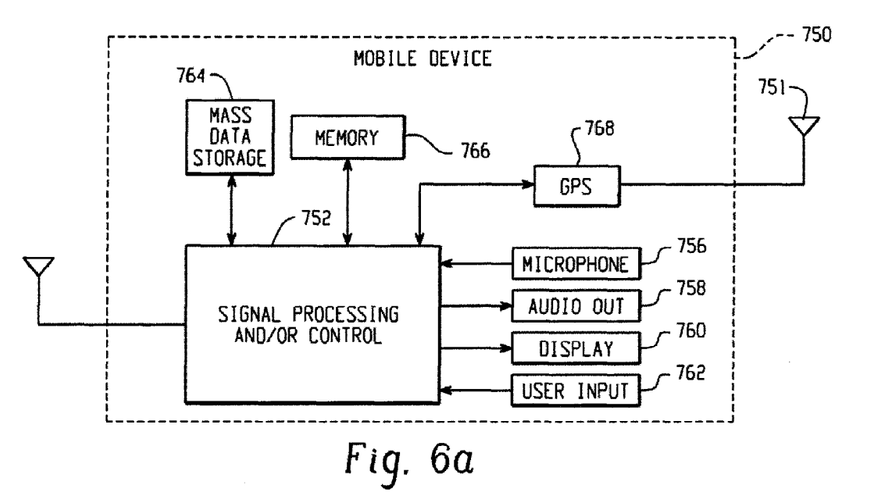
FIGS. 6a and 6b are example implementations of the interpolation system
Figure 6B:
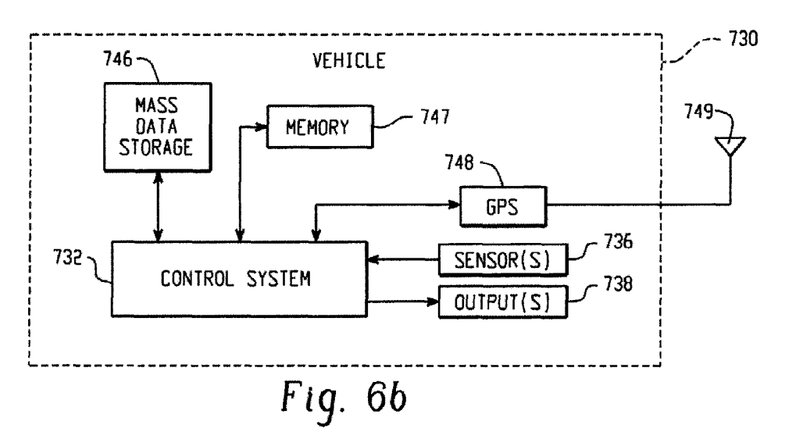

Referring now to FIGS. 6a and 6b, various exemplary implementations of the present invention interpolation system are shown. With reference to FIG. 6a, the interpolation system may be embodied in a mobile device 750 that may include an antenna 751. The interpolation system may implement either or both signal processing and/or control circuits, which are generally identified in FIG. 6a at 752, a GPS receiver and/or mass data storage 764 of the mobile device 750. In some implementations, mobile device 750 includes a microphone 756, an audio output 758 such as a speaker and/or audio output jack, a display 760 and/or an input device 762 such as a keypad, pointing device, voice actuation and/or other input device. Signal processing and/or control circuits 752 and/or other circuits (not shown) in mobile device 750 may process data, perform coding and/or encryption, perform calculations, format data and/or perform other cellular phone functions.

Mobile device 750 may communicate with mass data storage 764 that stores data in a nonvolatile manner such as optical and/or magnetic storage devices for example hard disk drives HDD and/or DVDs. The HDD may be a mini HDD that includes one or more platters having a diameter that is smaller than approximately 1.8". Mobile device 750 may be connected to memory 766 such as RAM, ROM, low latency nonvolatile memory such as flash memory and/or other suitable electronic data storage. Mobile device 750 also may support connections with a GPS receiver 768.

Referring now to FIG. 6b, the present invention interpolation system implements a control system of a vehicle 730, a GPS receiver and/or mass data storage of the vehicle control system. In some implementations, the interpolation system implements a control system 732 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals. In some implementations, control system 740 may be a navigation system, a telematics system, a vehicle telematics system, a lane departure system, an adaptive cruise control system, a vehicle entertainment system such as a stereo, DVD, compact disc and the like. Still other implementations are contemplated.

Control system 732 may communicate with mass data storage 746 that stores data in a nonvolatile manner. Mass data storage 746 may include optical and/or magnetic storage devices for example hard disk drives HDD and/or DVDs. The HDD may be a mini HDD that includes one or more platters having a diameter that is smaller than approximately 1.8". Control system 732 may be connected to memory 747 such as RAM, ROM, low latency nonvolatile memory such as flash memory and/or other suitable electronic data storage. Control system 732 also may support connections with a GPS receiver 748, which receives GPS signals through an antenna 749. The control system 740 may also include mass data storage, memory and/or a WLAN interface (all not shown).

This written description uses examples to disclose the invention, include the best mode, and also to enable a person skilled in the art to make and use the invention. The patentable scope of the invention may include other examples that occur to those skilled in the art.

It is claimed:

1. A global positioning satellite (GPS) receiver comprising:
   a memory configured to store a GPS pseudorandom noise (PRN) code received from a global positioning satellite;
   a local PRN code generator configured to generate a replica PRN code having a repeating code, wherein the repeating code of the replica PRN code includes at least a first epoch and a second epoch; and
   an interpolator configured to (i) determine an offset point in the first epoch of replica PRN code and (ii) interpolate the replica PRN code at a predetermined sample rate to generate an interpolated replica PRN code for use in correlating with the GPS PRN code, wherein the interpolated replica PRN code is generated by
      interpolating, from a starting point in the second epoch of replica PRN code to an end point in the second epoch of PRN code, and
      returning to the offset point in the first epoch of PRN code and interpolating from the offset point in the first epoch of PRN code to the starting point in the second epoch of PRN code, such that a full epoch of replica PRN code is interpolated from the offset point to the end point.

2. The GPS receiver of claim 1, wherein the interpolator is further configured to change the offset point in the first epoch of replica PRN code and generate a second interpolated replica PRN code.

3. The GPS receiver of claim 2, wherein each offset point of replica PRN code corresponds to a Doppler offset.

4. The GPS receiver of claim 1, wherein the local PRN code generator shifts the interpolated replica PRN code.

5. The GPS receiver of claim 1, wherein the interpolating is performed at a 2 MHz sample rate.

6. The GPS receiver of claim 1, wherein the interpolated replica PRN code is output to a memory.

7. The GPS receiver of claim 1, wherein the interpolated replica PRN code is correlated with the GPS PRN code.

8. The GPS receiver of claim 6, wherein the interpolated replica PRN code is removed from the memory after a second interpolated replica PRN code is generated.

9. The GPS receiver of claim 7, wherein interpolated replica PRN code is removed from the memory after correlating the interpolated replica PRN code with the GPS PRN code.

10. The GPS receiver of claim 1, wherein the GPS receiver is part of a navigation unit of a vehicle.

11. The GPS receiver of claim 1, wherein the memory is a buffer.

12. A method for interpolating global positioning satellite (GPS) pseudorandom noise (PRN) codes, the method comprising:
    receiving, at a GPS receiver, a GPS PRN code from a global positioning satellite;
    generating, at the GPS receiver, a replica PRN code having a repeating code, wherein the repeating code of the PRN code includes at least a first epoch and a second epoch;
    determining, at the GPS receiver, an offset point in the first epoch of replica PRN code; and
    interpolating, at the GPS receiver, the replica PRN code at a predetermined sample rate to generate an interpolated replica PRN code for use in correlating with the GPS PRN code, the interpolated replica PRN code being generated by
       interpolating, from a starting point in the second epoch of replica PRN code to an end point in the second epoch of PRN code, and
       returning to the offset point in the first epoch of PRN code and interpolating from the offset point in the first epoch of PRN code to the starting point in the second epoch of PRN code, such that a full epoch of replica PRN code is interpolated from the offset point to the end point.

13. The method of claim 12, further comprising, changing the offset point in the first epoch of replica PRN code and generating a second interpolated replica PRN code.

14. The method of claim 13, wherein each offset point of replica PRN code corresponds to a Doppler offset.

15. The method of claim 12, further comprising shifting, at the GPS receiver, the interpolated replica PRN code.

16. The method of claim 12, wherein the interpolating is performed at a 2 MHz sample rate.

17. The method of claim 12, wherein the interpolated replica PRN code is output to the memory.

18. The method of claim 17, further comprising correlating, at the GPS receiver, the interpolated replica PRN code with the GPS PRN code.

19. The method of claim 17, further comprising, removing, at the GPS receiver, the interpolated replica PRN code from the memory after a second interpolated replica PRN code is generated.

20. The method of claim 18, further comprising, removing, at the GPS receiver, the interpolated replica PRN code from the memory after correlating the interpolated replica PRN code with the GPS PRN code.

* * * * *